United States Patent [19]

(12) United States Patent
Levin et al.

(10) Patent No.: US 10,162,679 B2
(45) Date of Patent: Dec. 25, 2018

(54) METHOD AND SYSTEM FOR ASSIGNING A COMPUTATIONAL BLOCK OF A SOFTWARE PROGRAM TO CORES OF A MULTI-PROCESSOR SYSTEM

(71) Applicant: Huawei Technologies Co., Ltd., Shenzhen (CN)

(72) Inventors: Mikhail Petrovich Levin, Moscow (RU); Alexander Vladimirovich Slesarenko, Moscow (RU); Hongbo Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 68 days.

(21) Appl. No.: 15/088,974

(22) Filed: Apr. 1, 2016

(65) Prior Publication Data

US 2016/0239348 A1 Aug. 18, 2016

Related U.S. Application Data

(63) Continuation of application No. PCT/RU2013/000876, filed on Oct. 3, 2013.

(51) Int. Cl.
*G06F 9/50* (2006.01)

(52) U.S. Cl.
CPC ............ *G06F 9/5044* (2013.01); *G06F 9/505* (2013.01); *G06F 9/5094* (2013.01); *G06F 2209/5017* (2013.01); *Y02D 10/22* (2018.01)

(58) Field of Classification Search
None
See application file for complete search history.

(56) References Cited

U.S. PATENT DOCUMENTS

| 6,587,938 | B1 | 7/2003 | Eilert et al. |
| 7,285,958 | B2 * | 10/2007 | Overby .................... F16L 1/11 324/326 |

(Continued)

FOREIGN PATENT DOCUMENTS

| EP | 1574965 B1 | 6/2007 |
| EP | 1916601 A2 | 4/2008 |

(Continued)

OTHER PUBLICATIONS

KIPO, Written Opinion, dated Jan. 11, 2017, Korean Intellectual Property Office, pp. 1-4 (Year: 2017).*

(Continued)

*Primary Examiner* — Abu Ghaffari
(74) *Attorney, Agent, or Firm* — Leydig, Voit & Mayer, Ltd.

(57) ABSTRACT

A method for assigning a computational block of a software program to cores of a multi-processor system includes: evaluating a first number of available cores of a first type of the multi-processor system and a second number of available cores of a second type of the multi-processor system; determining a first number of loops of the computational block for binding with the cores of the first type and a second number of loops of the computational block for binding with the cores of the second type; binding the first number of loops with the cores of the first type and binding the second number of loops with the cores of the second type; and executing the loops of the computational block according to the binding.

9 Claims, 7 Drawing Sheets

(56) References Cited

U.S. PATENT DOCUMENTS

| | | | |
|---|---|---|---|
| 7,446,773 B1* | 11/2008 | Alben | G06F 9/4893 345/502 |
| 7,924,459 B2* | 4/2011 | Uji | H04N 1/405 358/1.9 |
| 8,020,163 B2 | 9/2011 | Nollet et al. | |
| 8,707,314 B2* | 4/2014 | Gummaraju | G06F 9/5044 718/102 |
| 2005/0097509 A1* | 5/2005 | Rong | G06F 8/4452 717/106 |
| 2007/0220525 A1* | 9/2007 | State | G06F 9/4881 718/107 |
| 2007/0255929 A1 | 11/2007 | Kasahara et al. | |
| 2008/0215584 A1* | 9/2008 | Furusho | G06F 17/30486 |
| 2009/0089795 A1* | 4/2009 | Yoshida | G06F 9/4881 718/107 |
| 2009/0150898 A1* | 6/2009 | Sohn | G06F 9/4881 718/105 |
| 2009/0158248 A1 | 6/2009 | Linderman et al. | |
| 2010/0125847 A1 | 5/2010 | Hayashi | |
| 2010/0218196 A1* | 8/2010 | Leung | G06F 8/453 718/107 |
| 2010/0235611 A1* | 9/2010 | Yamashita | G06F 8/4432 712/220 |
| 2011/0113224 A1* | 5/2011 | Isshiki | G06F 11/3419 712/240 |
| 2011/0161943 A1* | 6/2011 | Bellows | G06F 9/4843 717/149 |
| 2011/0231616 A1* | 9/2011 | Lin | G06F 9/3828 711/147 |
| 2012/0079467 A1* | 3/2012 | Tojo | G06F 8/452 717/150 |
| 2012/0192200 A1 | 7/2012 | Rao et al. | |
| 2013/0232476 A1* | 9/2013 | Varma | G06F 8/443 717/150 |
| 2013/0268943 A1* | 10/2013 | Solihin | G06F 9/5088 718/104 |
| 2014/0149993 A1* | 5/2014 | Sandstrom | G06F 9/54 718/108 |
| 2014/0189299 A1* | 7/2014 | Narvaez | G06F 9/3891 712/30 |
| 2015/0025848 A1* | 1/2015 | Fukumoto | G06F 9/5061 702/186 |
| 2016/0139901 A1* | 5/2016 | Margiolas | G06F 8/456 717/150 |
| 2016/0239348 A1* | 8/2016 | Levin | G06F 9/5044 |

FOREIGN PATENT DOCUMENTS

| | | | |
|---|---|---|---|
| JP | H02068651 A | | 3/1990 |
| JP | 03139758 A | * | 6/1991 |
| JP | 2010122758 A | | 6/2010 |
| JP | 2011197803 A | | 10/2011 |
| KR | 20070061795 A | | 6/2007 |
| WO | WO 2007072458 A2 | | 6/2007 |

OTHER PUBLICATIONS

Guo et al., "A Lightweight Dynamic Performance Monitoring Framework for Embedded Systems," International Conference on Embedded Software Systems, pp. 256-262, Institute of Electrical and Electronics Engineers, New York, New York (2009).

Chen et al., "Accelerating MapReduce on a Coupled CPU-GPU Architecture," SC12, Institute of Electrical and Electronics Engineers, New York, New York (2012).

Zhou et al., "Efficient and Flexible Architectural Support for Dynamic Monitoring," ACM Transactions on Architecture and Code Optimization, vol. 2, Issue 1, pp. 3-33, ACM, Inc., New York, New York (Mar. 2005).

Deshpande, "Heterogeneous Computing and Load Balancing Techniques for Monte Carlo Simulation in a Distributed Environment-Dissertation," pp. ii-44 (2011).

Gerenkov et al., "System-Wide Analyzer of Performance: Performance Analysis of Multi-Core Computing Systems with Limited Resources," pp. 1299-1304, Institute of Electrical and Electronics Engineers, New York, New York (2009).

* cited by examiner

METHOD AND SYSTEM FOR ASSIGNING A COMPUTATIONAL BLOCK OF A SOFTWARE PROGRAM TO CORES OF A MULTI-PROCESSOR SYSTEM

CROSS-REFERENCE TO RELATED APPLICATIONS

This application is a continuation of International Patent Application No. PCT/RU2013/000876, filed on Oct. 3, 2013, which is hereby incorporated by reference in its entirety.

TECHNICAL FIELD

The present disclosure relates to a method and a system for assigning a computational block of a software program to cores of a multi-processor system. The disclosure further relates to a system and method of adaptive task scheduling in multi-core and many-core heterogeneous computing systems.

BACKGROUND

Multi-core and many-core heterogeneous computing systems (MMCHCS) recently are widely used in networking, mobile systems such as mobile phones, PDAs and even subnotebook computers. These systems contain two types of processor cores: usual cores intended for high performance operation and low power cores intended for power aware operation. The cores of second type allow cut up energy consumption of computing system in cases when it is possible. This also leads to decreasing of power consumption of computing systems and allows prolong a battery life in mobile systems without recharging. Very often all cores or processors are located on the same chip and in this case these systems are known as system-on-chip (SoC) computing systems. The usual system software using for operation of MMCHCS consist of compiler and scheduler. The compiler is responsible for creation of program running on such devices and the scheduler is responsible for loading of such devices on run-time. The main question in software development for these systems is in solution of problem what kind of core should be used for operation of current program block in MMCHCS. In all modern compilers this solution is made by programmer so-called manually. This means that every programmer following to his own ideas about prediction of efficiency of MMCHCS decides what kind of cores he will use for running of current block of his program and rigidly assigns current block to core type in his program by himself so-called manually.

During the following run of the program it is not possible to change this assignment by any manner. The modern schedulers can't change this politics also. This follows to the loss of efficiency of MMCHCS due to unbalancing of computations.

Each program 100 consists of sequential blocks 101, 105, 109 as shown in FIG. 1. The first and the last blocks 101, 109 are always sequential, but all other intermediate blocks 103, 105, 107 can be sequential, parallel or massive parallel.

The difference between parallel 103 and massive parallel 107 blocks lies in the number of parallel loops when the parallel block 103 is running on specified cores. For example, if a parallel block 103 has 8 loops and the computing system contains 8 available cores, then this block will be parallel or simple parallel, but not massive parallel, because all loops can be loaded into the cores at once. If there are 8 loops, but on the system with only 2 available cores, then there is a massive parallel block, because it needs 4 times to load all loops.

The following definition of massive parallel blocks is used in the following. There are K cores or processors and N parallel loops in block. Then if $N/K>3$, the considering block is massive parallel. Otherwise the block is a simple parallel or parallel. Thus if all available loops can be loaded in 1, 2 or 3 times, then the considering parallel block is simply parallel or parallel. Otherwise, then it needs 4, or more times to load all available loops by loops of parallel block, there is a massive parallel block.

Currently used multi-core and many-core heterogeneous computing systems (MMCHCS) are static with respect to scheduling program blocks to processor cores. Partitioning of the workload for CPU is static and cannot be dynamically changed, in particular static load balancing schemes are used and background tasks are not monitored. Currently used MMCHCS systems are inflexible and user unfriendly.

SUMMARY

It is the object of the invention to provide a technique for flexible scheduling program tasks on a multi processor system.

This object is achieved by the features of the independent claims. Further implementation forms are apparent from the dependent claims, the description and the figures.

The invention is based on the finding that a technique for flexible scheduling program tasks on a multi-processor system can be achieved by automatically assignment of current massive parallel computational blocks in software to core types in MMCHCS to provide power efficient load balancing of these systems on runtime.

An automatic assignment of current massive parallel computational blocks is provided in software to core type in MMCHCS to provide optimal load balancing of these systems in run-time.

Dynamic loop-to-processor mapping is based on available resources in run-time for massive parallel block execution in multi-core and many-core processors. Based on estimated available resources of MMCHCS before massive parallel block execution, the scheduler decides how many loops and which loops are associated with cores of the MMCHCS. This solution minimizes the latency of different type cores loading during the massive parallel block execution.

Applying that solution increases the efficiency of using computational systems with multi-core and many-core architectures which are composed of two type cores.

The presented methods can be practically implemented with suitable labor costs. Aspects of the invention can be applied in the most common special case of parallelism. Namely, the case of parallel running a large number of identical subtasks of one initial task is observed. Such kind of parallelism exists when executing different iterations of one loop in parallel. Meanwhile, usually it is exactly the loops who take most of the executing time of the whole program. Aspects of the invention thus provide the most effective approaches of using parallelism by exploiting parallelization of loop iterations.

In order to describe the invention in detail, the following terms, abbreviations and notations will be used:
MMCHCS: Multi-core and many-core heterogeneous computing systems.
SoC: System on chip.
CPU: Central processing unit.

According to a first aspect, the invention relates to a method for assigning a computational block of a software program to cores of a multi-processor system, the method comprising: evaluating a first number of available cores of a first type of the multi-processor system and a second number of available cores of a second type of the multi-processor system; determining a first number of loops of the computational block for binding with the cores of the first type and a second number of loops of the computational block for binding with the cores of the second type; binding the first number of loops with the cores of the first type and binding the second number of loops with the cores of the second type; and executing the loops of the computational block according to the binding.

By binding the first number of loops with the cores of the first type and binding the second number of loops with the cores of the second type, the performance of the multi-processor system in increased and the minimal completion time is decreased. By that specific binding of loops to processor cores, the load balancing problem is solved and the total completion time of each particular application is minimized. Optimal loop-to-core mapping is presented that makes completion time reach its potential minimum. Executing the loops of the computational block according to the binding makes completion time reach its potential minimum.

In a first possible implementation form of the method according to the first aspect, the determining the first number and the second number of loops is according to a load balancing relation with respect to the available cores of the first type and the available cores of the second type.

Determining the first number and the second number of loops is according to a load balancing relation with respect to the available cores of the first type and the available cores of the second type reduce programmer efforts on developing parallel applications for heterogeneous hardware. This kind of effect results in making the process of developing parallel application for multi-processor systems such as MMCHCS hardware easier. Before that, the programmers needed to spend a lot of time considering how to split the processors among cores, now this work can be done automatically. The specific determining leads to decreasing of labor costs of either software developing or effective porting of existing code to specific architecture.

In a second possible implementation form of the method according to the first aspect as such or according to the first implementation form of the first aspect, the determining the first and second number of loops is in accordance with a device performance of the cores of the first type and the cores of the second type.

When determining the first and second number of loops is in accordance with a device performance of the cores of the first type and the cores of the second type, the loops can be dynamically assigned to cores depending on their performance. That makes the multi-processor system fast and reduces its computational complexity.

In a third possible implementation form of the method according to the first aspect as such or according to any of the previous implementation forms of the first aspect, the evaluating the first number of available cores of the first type and the second number of available cores of the second type is based on evaluating a background load of the multi-processor system.

Evaluating the first number of available cores of the first type and the second number of available cores of the second type is based on evaluating a background load of the multi-processor system provides dynamic adaptation of specified tasks in a multi-processor system such as MMCHCS with the change of background load. Usage of dynamic monitoring block provides the dynamic adaptation of running specified tasks in MMCHCS with the change of, that is, on-the-fly background loads.

In a fourth possible implementation form of the method according to the first aspect as such or according to any of the previous implementation forms of the first aspect, the first number of loops is determined based on at least one of the following parameters: a loop execution time on the first core, a loop execution time on the second core, a clock frequency of the first core and a clock frequency of the second core.

When the first number of loops is determined based on these parameters, the performance of the whole system can be optimized.

In a fifth possible implementation form of the method according to the first aspect as such or according to any of the previous implementation forms of the first aspect, the first number of loops is determined according to the following relation:

$$n_1 \approx \left\lfloor \frac{N}{\left(\frac{K_{2act}}{K_{1act}}\right)\left(\frac{f_2}{f_1}\right) + 1} \right\rfloor,$$

where $K_1$ is a number of cores of the first type, $K_2$ is a number of cores of the second type, $K_{1act}$ are actual values of $K_1$, $K_{2act}$ are actual values of $K_2$, $T_1$ is a loop execution time on the first core, $T_2$ is a loop execution time on the second core, $f_1$ is a clock frequency of the first core, $f_2$ is a clock frequency of the second core, N is a total number of loops of the computational block and the operator $\lfloor \cdot \rfloor$ of a real-valued number denotes evaluation of an integer value of the number by omitting the fractional part of the number.

When the first number of loops is determined according to these relations, the performance of the multi-processor system can be determined and accordingly controlled.

In a sixth possible implementation form of the method according to the first aspect as such or according to any of the previous implementation forms of the first aspect, the second number of loops is determined such that a sum of the second number of loops and the first number of loops corresponds to the total number of loops.

When the second number of loops is determined such that a sum of the second number of loops and the first number of loops corresponds to the total number of loops, each of the loops can be assigned to a specific core in run-time. Waiting times for execution of loops is decreased.

In a seventh possible implementation form of the method according to the first aspect as such or according to any of the previous implementation forms of the first aspect, the evaluating the first number of available cores is based on evaluating a number of cores of the first type busy with a background load; and the evaluating the second number of available cores is based on evaluating a number of cores of the second type busy with a background load.

When evaluating the first number of available cores is based on evaluating a number of cores of the first type busy with a background load; and the evaluating the second number of available cores is based on evaluating a number of cores of the second type busy with a background load, the multi-processor system provides dynamic adaptation of specified tasks with the change of background load. That allows dynamic adaptation of running specified tasks with the change of background loads, i.e., on-the-fly.

In an eighth possible implementation form of the method according to the seventh implementation form of the first aspect, a sum of the first number of available cores of the first type and the number of cores of the first type busy with the background load corresponds to a total number of cores of the first type; and a sum of the second number of available cores of the second type and the number of cores of the second type busy with the background load corresponds to a total number of cores of the second type.

When a sum of the first number of available cores of the first type and the number of cores of the first type busy with the background load corresponds to a total number of cores of the first type and a sum of the second number of available cores of the second type and the number of cores of the second type busy with the background load corresponds to a total number of cores of the second type, each of the loops can be assigned to a specific core in run-time. Waiting times for execution of loops is decreased.

In a ninth possible implementation form of the method according to the first aspect as such or according to any of the previous implementation forms of the first aspect, the multi-processor system comprises a multi-core and many-core heterogeneous computing system.

The method thus can be optimally applied to multi-core and many-core heterogeneous computing system making these systems dynamic and flexible.

In a tenth possible implementation form of the method according to the first aspect as such or according to any of the previous implementation forms of the first aspect, the computational block of the software program comprises a massive parallel computational block.

For massive parallel computational blocks, a significant performance improvement can be reached.

In an eleventh possible implementation form of the method according to the first aspect as such or according to any of the previous implementation forms of the first aspect, a power consumption of the cores of the first type is different from a power consumption of the cores of the second type.

When power consumption of the cores of the first type is different from a power consumption of the cores of the second type, flexible scheduling of program tasks can be efficiently performed by using the presented method.

According to a second aspect, the invention relates to a system for assigning loops of a computational block of a software program to cores of a multi-processor system, the multi-processor system comprising cores of a first type and cores of a second type, the system comprising: a monitoring block, configured for evaluating available resources of the cores of the first type and available resources of the cores of the second type; and a binding block, configured for binding the loops with the cores of the first type and the cores of the second type based on the evaluated available resources of the cores of the first type and the cores of the second type.

By the binding block, configured for binding the loops with the cores of the first type and the cores of the second type based on the evaluated available resources of the cores of the first type and the cores of the second type, the performance of the multi-processor system is increased and the minimal completion time is decreased. By that specific binding of loops to processor cores, the load balancing problem is solved and the total completion time of each particular application is minimized. Optimal loop-to-core mapping is achieved that makes completion time reach its potential minimum.

In a first possible implementation form of the system according to the second aspect, the system comprises a massive parallel computational block configured for executing the loops bound with the cores by the binding block.

Executing the loops of the massive parallel computational block according to the binding makes completion time reach its potential minimum.

In a second possible implementation form of the system according to the second aspect as such or according to the first implementation form of the second aspect, the binding block is configured for dynamically binding the loops with the cores such that the massive parallel computational block is executed with the bound loops in run-time.

When the massive parallel computational block is executed with the bound loops in run-time, the performance of the system can by dynamically optimized.

A further aspect of the invention provides a method of adaptive task scheduling in multi-core and many-core heterogeneous computing systems with functionally different power consumption cores, which include the following steps: 1) Based on monitoring block, through dynamic monitoring the MMCHCS system before the start of massive parallel block execution, 2) evaluate the effective number of cores $k_{1act}$ and $k_{2act}$ of the first and the second type. 3) Evaluate the number of loops $n_1$ which will be binding with the cores of the first type. 4) Based on $n_2=N-n_1$, evaluate the number of loops $n_2$ which will be binding with the cores of the second type. 5) Specify the binding of $n_1$ loops with cores of the first type in the binding block. 6) Specify the binding of $n_2$ loops with cores of the second type in the binding block. 7) Execute loops on specified cores according to specified order.

A further aspect of the invention provides a system of adaptive task scheduling in multi-core and many-core heterogeneous computing systems with functionally different power consumption cores, consisting of: a monitoring block which is responsible for dynamic monitoring and evaluating the free resources of cores of the MMCHCS system before massive parallel block execution; and a binding block which is responsible for dynamic loop-to-core mapping based on available resources in run-time for massive parallel block execution in multi-core and many-core processors so as to dynamic bind the loops and the cores.

A further aspect provides a system with signal processors of SoC type in which a lot of massive parallel blocks are executed simultaneously according to the method above.

The methods, systems and devices described herein may be implemented as software in a Digital Signal Processor (DSP), in a micro-controller or in any other side-processor or as hardware circuit within an application specific integrated circuit (ASIC).

The invention can be implemented in digital electronic circuitry, or in computer hardware, firmware, software, or in combinations thereof, e.g. in available hardware of conventional mobile devices or in new hardware dedicated for processing the methods described herein.

BRIEF DESCRIPTION OF THE DRAWINGS

Further embodiments of the invention will be described with respect to the following figures, in which.

DETAILED DESCRIPTION OF EMBODIMENTS

Figure 1:
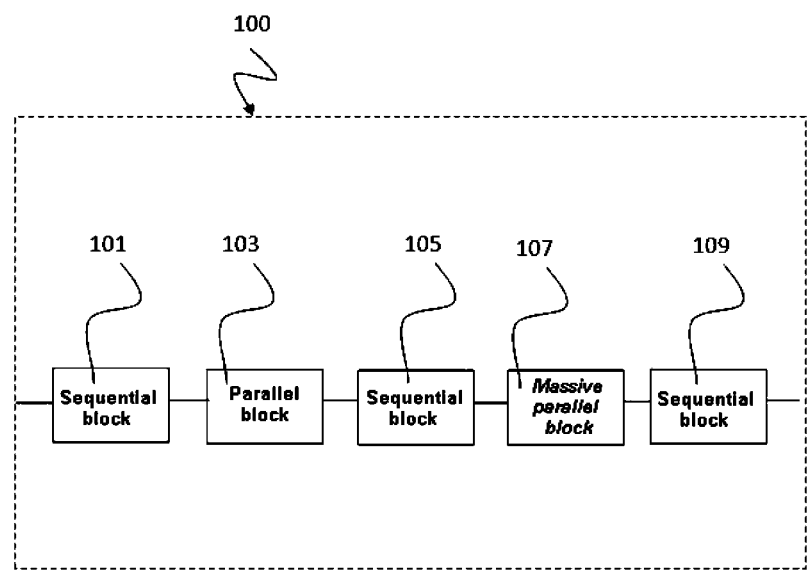
FIG. 1 shows one example of a conventional program structure.
Figure 2:
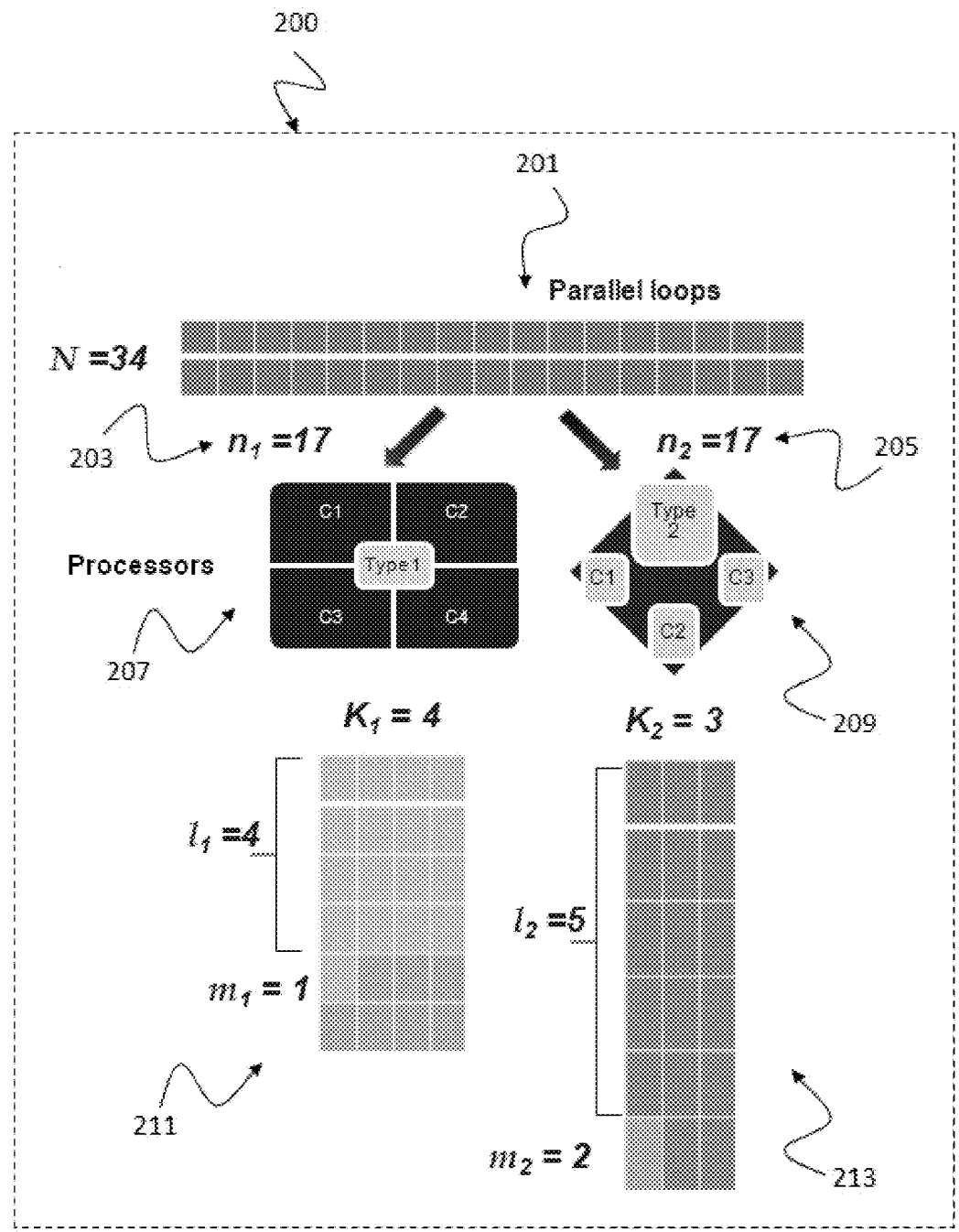
FIG. 2 shows one example illustrates loops spreading among cores in MMCHCS according to an implementation form.

FIG. 2 shows one example illustrating loops spreading among cores in a multi-core and many-core heterogeneous computing system 200 according to an implementation form.

The multi-core and many-core heterogeneous computing system has $K_1$ cores of the first type 207 and $K_2$ cores of the second type 209, totally $K=K_1+K_2$ cores. The number of loops 203 which will be executed on cores of the first type 207 is denoted as $n_1$ and the number of loops 205 which will be executed on the second type cores 209 is denoted as $n_2$. Then $n_1$ and $n_2$ can be presented in the following form:

$$n_1 = l_1 K_1 + m_1,$$

and $$n_2 = l_2 K_2 + m_2.$$

FIG. 2 illustrates the above mentioned relations. Then a total time of execution $T_{fi}$ on cores of i-type (i=1,2) of MMCHCS will be as follows:

$$T_{fi} = \begin{cases} l_i T_i, & \text{if } m_i = 0, \\ (l_i+1)T_i, & \text{if } m_i \neq 0. \end{cases}$$

Here, $T_i$ is a time of one loop execution on cores of i-type (i=1,2) of MMCHCS.
If $$l_i \gg 1$$

then $$T_{fi} \approx l_i T_i$$

and $$n_i = l_i k_i, (i=1,2).$$

In this case the load balancing condition on cores of different type can be written as follows:

$$T_{f1} = T_{f2},$$

or $$l_1 T_1 \approx l_2 T_2,$$

or $$\frac{n_1}{K_1} T_1 \approx \frac{n_2}{K_2} T_2$$

Substituting $n_2 = N - n_1$ into the last formula after some transformations results in:

$$n_1 \approx \frac{N}{\left(\frac{K_2}{K_1}\right)\left(\frac{T_1}{T_2}\right)+1}, \quad (1)$$

and $$n_2 \approx \frac{N\left(\frac{K_2}{K_1}\right)\left(\frac{T_1}{T_2}\right)}{\left(\frac{K_2}{K_1}\right)\left(\frac{T_1}{T_2}\right)+1}. \quad (2)$$

Figure 3:
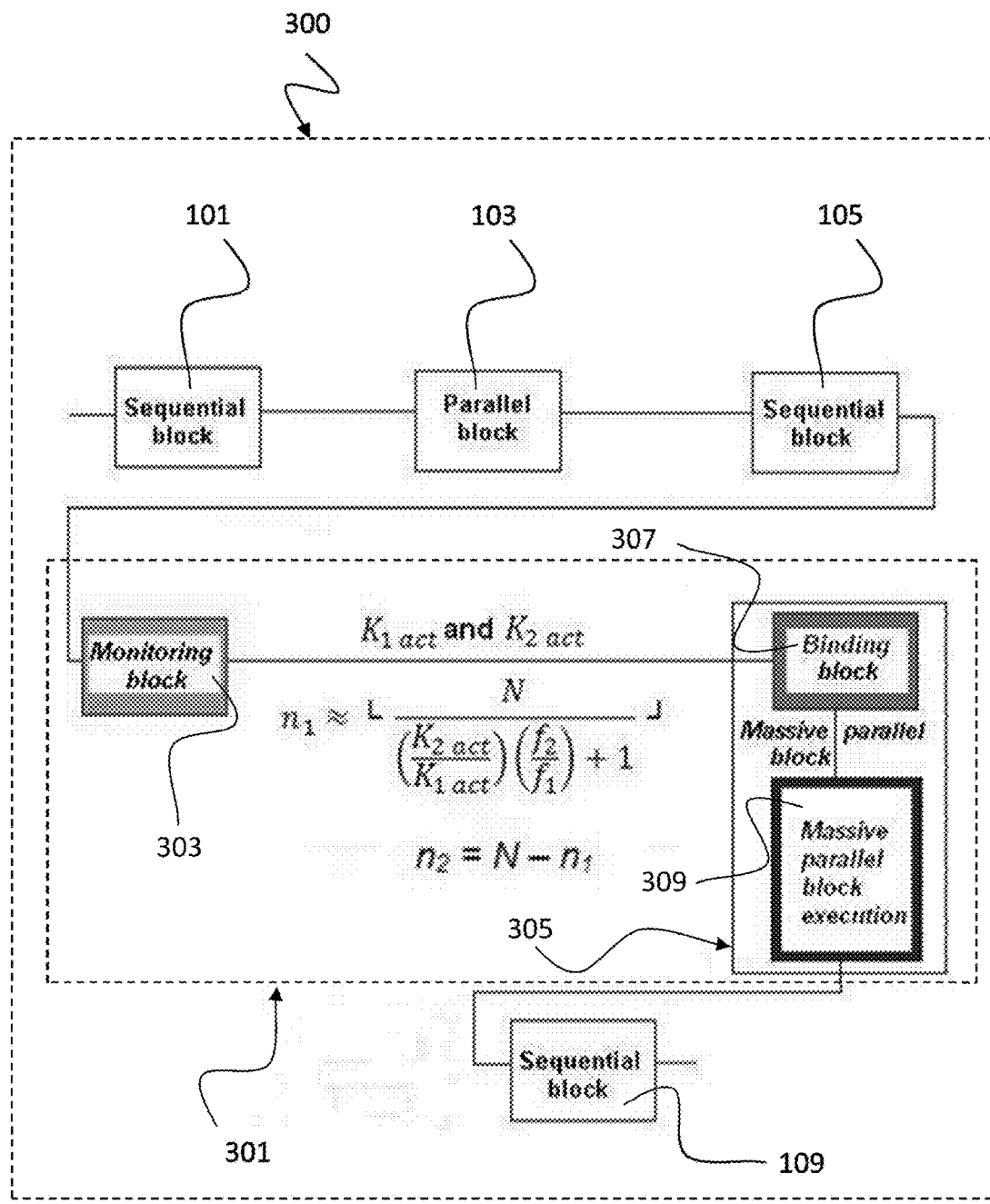
FIG. 3 shows one example of a modified program structure with monitoring block before massive parallel block and binding block inside massive parallel block before massive parallel block execution according to an implementation form.

FIG. 3 shows one example of a modified program structure with monitoring block before massive parallel block and binding block inside massive parallel block before massive parallel block execution according to an implementation form.

In this example, the following notation is used: $K_1=K_2$ and $T_1=2T_2$, then $n_1 \approx N/3$, $n_2 \approx 2N/3$. This shows that more productive cores (here of the second type) evaluate ⅔ of loops in comparison with in twice less productive cores (here of the first type).

The main problem in usage of formulas (1) and (2) is in estimation of value $T_1$ and $T_2$. It is known that these values are satisfying to the following relation $$T_i = A/f_i, (i=1,2).$$

Here A is any constant and $f_i$ is clock frequency of the core i. Then formula (1) can be rewritten in the following form:

$$n_1 \approx \frac{N}{\left(\frac{K_2}{K_1}\right)\left(\frac{f_2}{f_1}\right)+1}. \quad (3)$$

Besides the assigning task as presented above, some other auxiliary tasks are also simultaneous running in MMCHCS. Therefore before evaluation by considering cycle in the investigated task monitoring of MMCHCS has to be provided and background load of cores of the considering system has to be found. For this purpose it is possible to use common dynamic monitoring tools.

Instead of real numbers of cores in the MMCHCS system $K_1$ and $K_2$, their actual values $K_{1\ act}$ and $K_{2\ act}$ shall be used. These values can be not only of integer type but also of real type satisfying to the following condition:

$$0 \leq K_{i\ act} \leq K_i, (Z=1,2).$$

Thus, formula (3) can be rewritten as:

$$n_1 \approx \left\lfloor \frac{N}{\left(\frac{K_{2act}}{K_{1act}}\right)\left(\frac{f_2}{f_1}\right)+1} \right\rfloor. \quad (4)$$

Here, the operator $\lfloor \cdot \rfloor$ denotes evaluation of the integer value of a real-valued number. The operation is performed by omitting the fractional part of the real-valued number. The appropriate program structure is shown in FIG. 3. It includes a Monitoring block 303 before a Massive parallel block 305 and a Binding block 307 inside the Massive parallel block 305 before the Massive parallel block execution 309.

Figure 4:
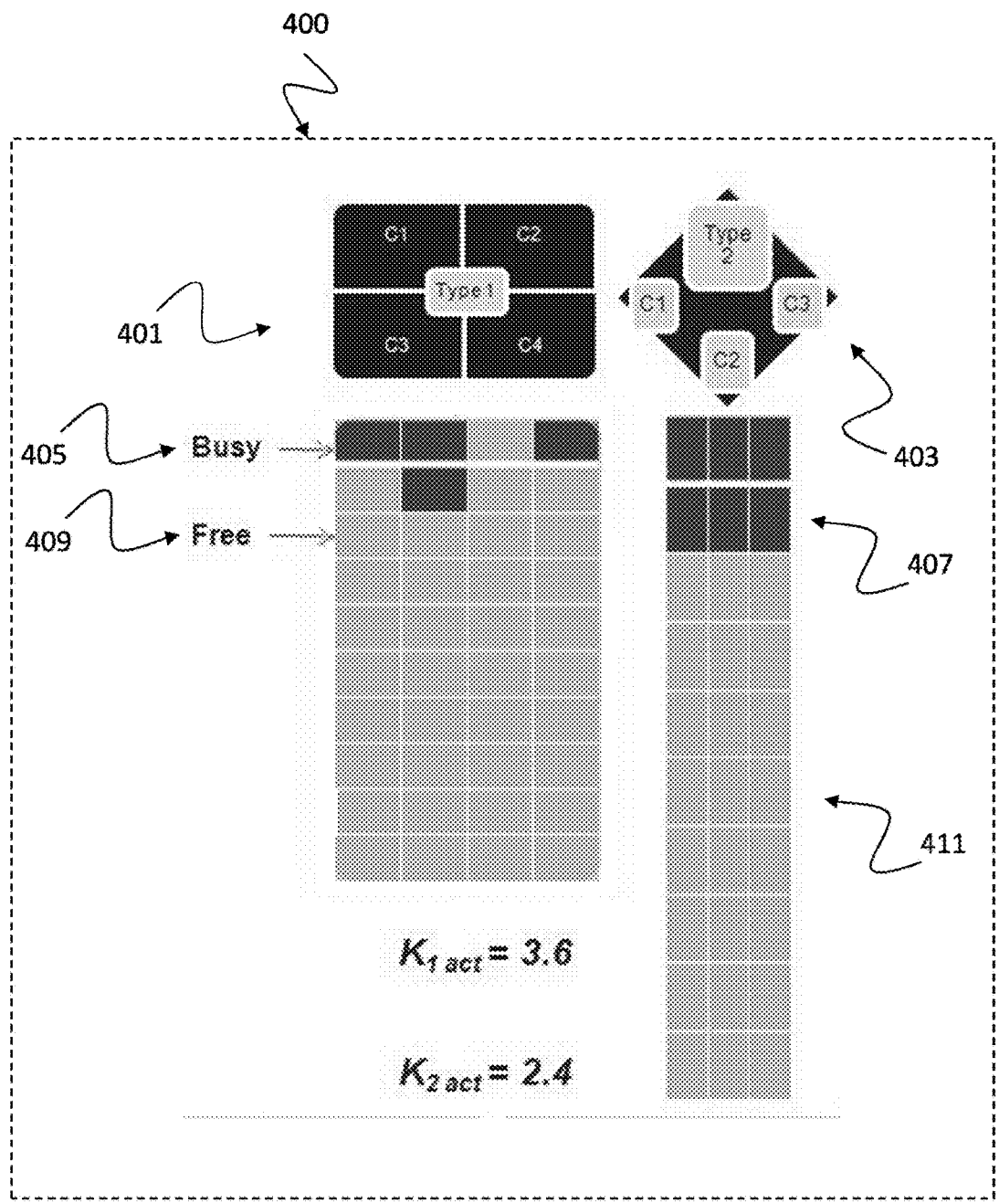
FIG. 4 shows a schematic diagram of a method 400 for choosing $K_{1\ act}$ and $K_{2\ act}$ based on monitoring data according to an implementation form.

FIG. 4 shows a schematic diagram of a method 400 for choosing $K_{1\,act}$ and $K_{2\,act}$ based on monitoring data according to an implementation form.

The example shows how to evaluate $K_{1\,act}$ and $K_{2\,act}$ on the monitoring data. The system 400 contains 4 cores of the first type 401 and 3 cores of the second type 403. Monitoring of the considering system is provided before start of current cycle. That monitoring shows that a background load 405 of the first type core 401 is equal to 10% and a background load 407 of each second type cores 403 is equal to 20%. Then instead $K_1=4$ and $K_2=3$ in formula (3), $K_{1\,act}=3.6$ and $K_{2\,act}=2.4$ can be substituted. The appropriate illustration is shown in FIG. 4.

For evaluation of $n_2$ the following relation can be used:

$$n_2 = N - n_1. \quad (5)$$

Formulas (4) and (5) are used for evaluating of balancing load of MMCHCS. They allow to minimize the latency of different type cores loading during the massive parallel block execution.

In the following, loops of massive parallel block are bound with processor cores, which formulate the method of adaptive task scheduling in MMCHCS.

1. Based on the monitoring block 303 described above with respect to FIG. 3, through dynamic monitoring the MMCHCS system before the start of massive parallel block execution, the actual numbers of cores $K_{1\,act}$ and $K_{2\,act}$ of the first and the second type are evaluated. It was shown above with respect to FIGS. 2 and 3 how $K_{1\,act}$ and $K_{2\,act}$ can be obtained.
2. Following to formula (4) the number of loops $n_1$ which will be binding with the cores of the first type is evaluated.
3. Following to formula (5) the number of loops $n_2$ which will be binding with the cores of the second type is evaluated.
4. $n_1$ loops are bound with cores of the first type in the binding block.
5. $n_2$ loops are bound with cores of the second type in the binding block.
6. Execute loops on specified cores according to specified order in massive parallel block.

Items 1, 2 and 3 are corresponding to the Monitoring block 303 described above with respect to FIG. 3 and items 4 and 5 are corresponding to the Binding block 307 shown in FIG. 3.

Figure 5:
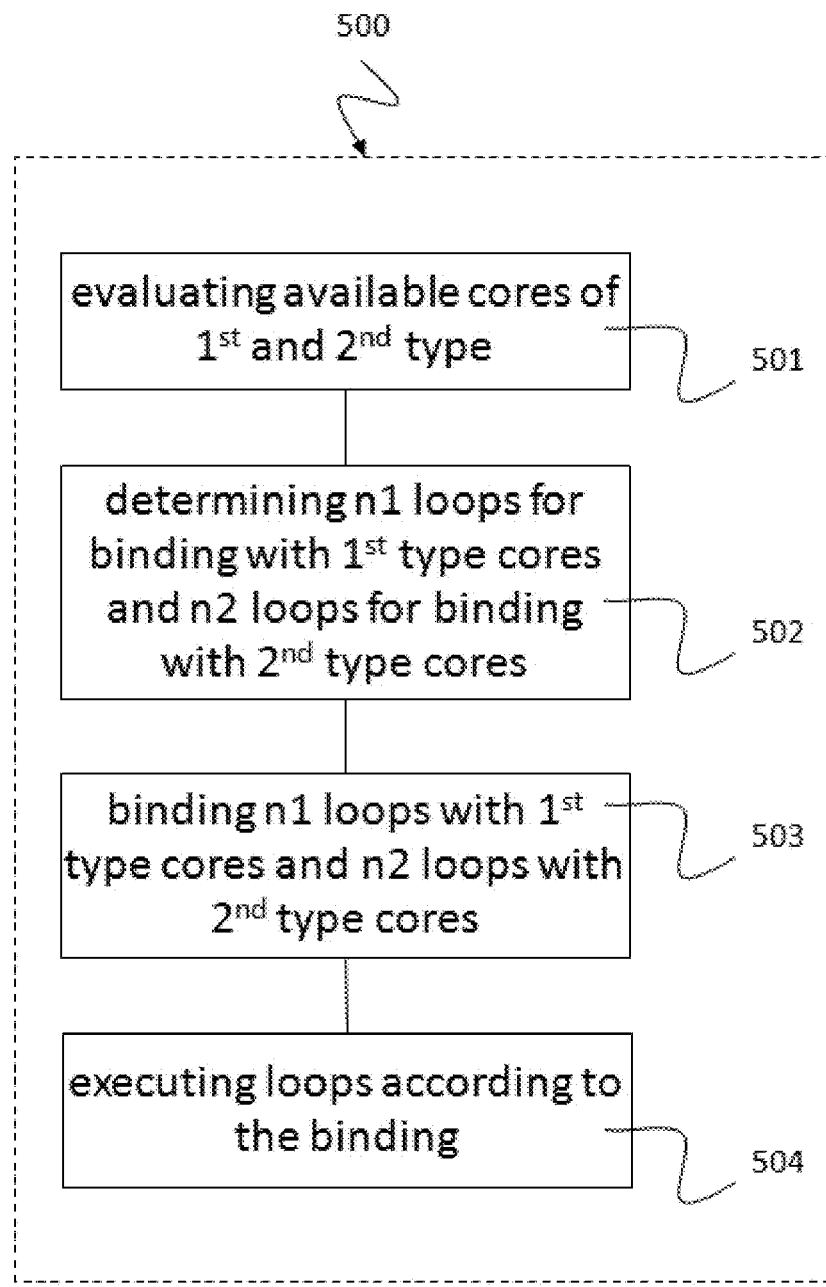
FIG. 5 shows a schematic diagram of a method 500 for assigning a computational block of a software program to cores of a multi-processor system according to an implementation form.
Figure 6:
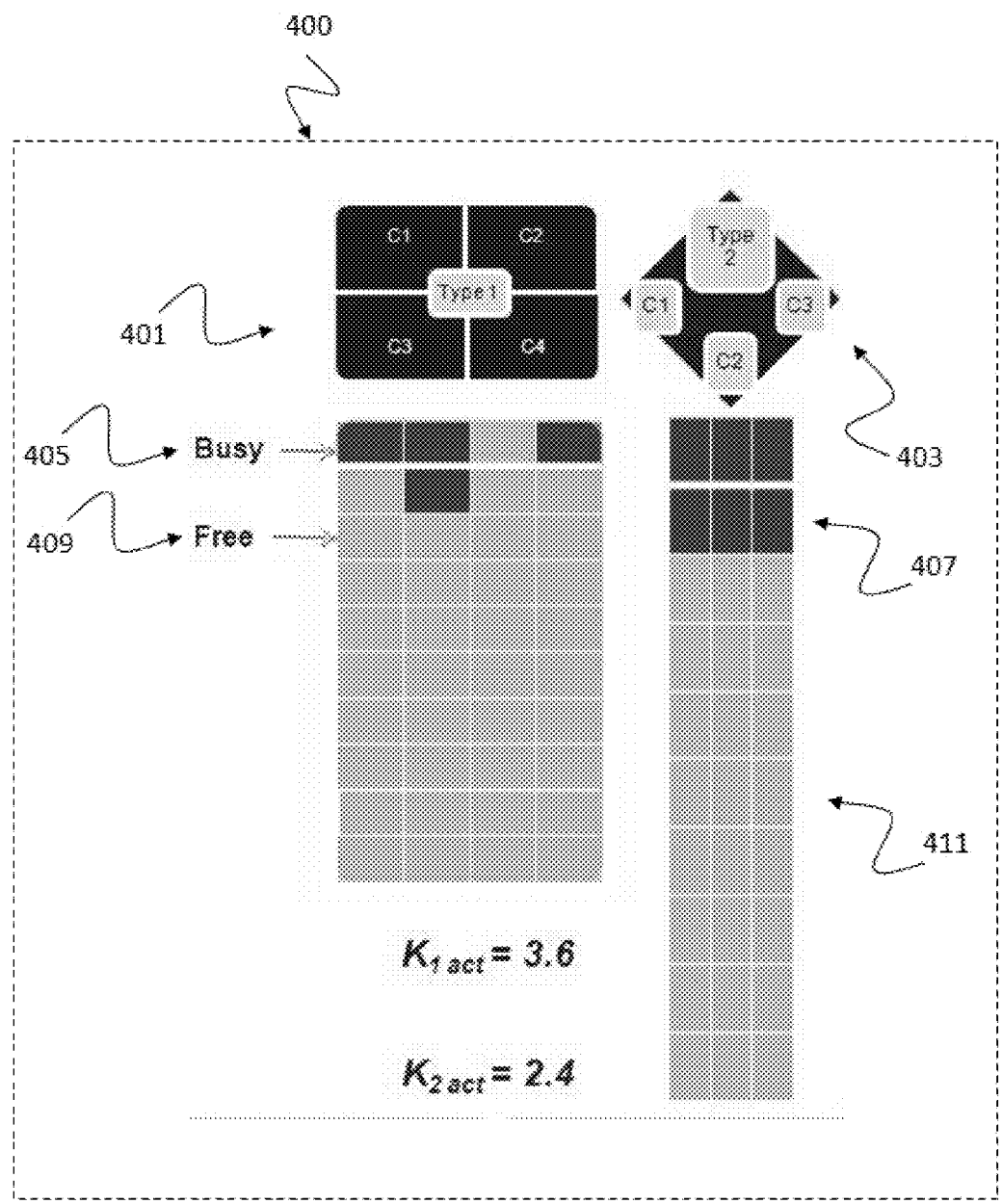
Figure 7:
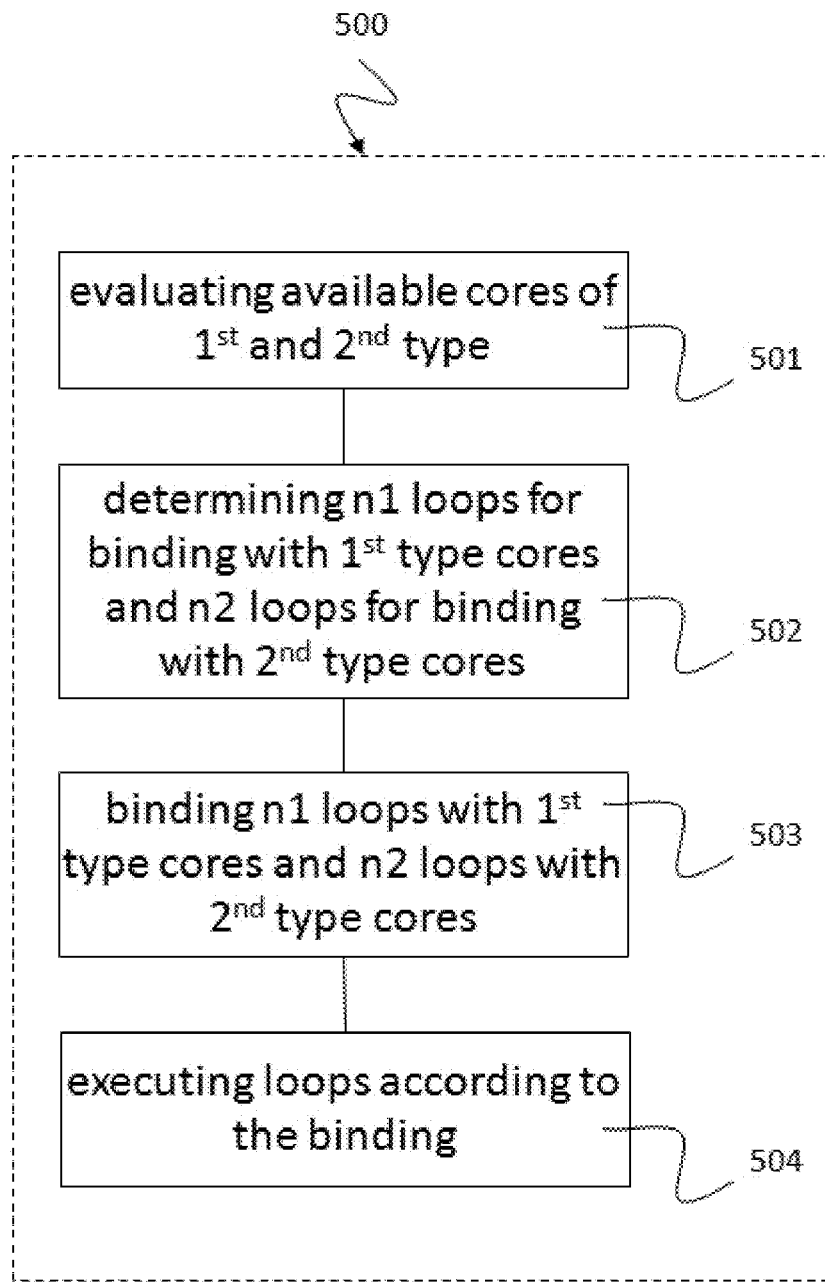

FIG. 5 shows a schematic diagram of a method 500 for assigning a computational block 301 of a software program 300 described above with respect to FIG. 3 to cores 401, 403 of a multi-processor system 400 described above with respect to FIG. 4 according to an implementation form. The method 500 comprises: evaluating 501 a first number K1act of available cores of a first type 409 of the multi-processor system 400 and a second number K2act of available cores of a second type 411 of the multi-processor system 400; determining 502 a first number n1 of loops 203 of the computational block for binding with the cores of the first type 409 and a second number n2 of loops 205 of the computational block for binding with the cores of the second type 411; binding 503 the first number n1 of loops 203 with the cores of the first type 409 and binding the second number n2 of loops 205 with the cores of the second type 411; and executing 504 the loops 203, 205 of the computational block 301 according to the binding 503.

In an implementation form of the method 500, the determining 502 the first number n1 and the second number n2 of loops 203, 205 is according to a load balancing relation with respect to the available cores of the first type 409 and the available cores of the second type 411. In an implementation form of the method 500, the determining 502 the first n1 and second number n2 of loops 203, 205 is in accordance with a device performance of the cores of the first type 409 and the cores of the second type 411. In an implementation form of the method 500, the evaluating 501 the first number K1act of available cores of the first type 409 and the second number K2act of available cores of the second type 411 is based on evaluating a background load of the multi-processor system 400. In an implementation form of the method 500, the first number n1 of loops is determined based on at least one of the following parameters: a loop execution time T1 on the first core 409, a loop execution time T2 on the second core 411, a clock frequency f1 of the first core 409 and a clock frequency f2 of the second core 411. In an implementation form of the method 500, the first number n1 of loops 203 is determined according to the following relation:

$$n_1 \approx \left\lfloor \frac{N}{\left(\frac{K_{2act}}{K_{1act}}\right)\left(\frac{f_2}{f_1}\right) + 1} \right\rfloor,$$

where $K_1$ is a number of cores of the first type, $K_2$ is a number of cores of the second type, $K_1$act are actual values of $K_1$, $K_{2act}$ are actual values of $K_2$, $T_1$ is a loop execution time on the first core, $T_2$ is a loop execution time on the second core, $f_1$ is a clock frequency of the first core, $f_2$ is a clock frequency of the second core, N is a total number of loops of the computational block and the operator $\lfloor \bullet \rfloor$ of a real-valued number denotes evaluation of an integer value of the number by omitting the fractional part of the number.

In an implementation form of the method 500, the second number n2 of loops 205 is determined such that a sum of the second number n2 of loops 205 and the first number n1 of loops 203 corresponds to the total number N of loops. In an implementation form of the method 500, the evaluating 501 the first number K1act of available cores 409 is based on evaluating a number of cores of the first type busy with a background load; and the evaluating the second number K2act of available cores 411 is based on evaluating a number of cores of the second type busy with a background load. In an implementation form of the method 500, a sum of the first number K1act of available cores of the first type 409 and the number of cores of the first type busy with the background load 405 corresponds to a total number K1 of cores of the first type; and a sum of the second number K2act of available cores of the second type 411 and the number of cores of the second type busy with the background load 407 corresponds to a total number K2 of cores of the second type. In an implementation form of the method 500, the multi-processor system 400 comprises a multi-core and many-core heterogeneous computing system. In an implementation form of the method 500, the computational block 301 of the software program 300 comprises a massive parallel computational block 301. In an implementation form of the method 500, a power consumption of the cores of the first type 409 is different from a power consumption of the cores of the second type 411.

The method 500 may be processed in a system 300 as described above with respect to FIG. 3.

From the foregoing, it will be apparent to those skilled in the art that a variety of methods, systems, computer programs on recording media, and the like, are provided.

The present disclosure also supports a computer program product including computer executable code or computer executable instructions that, when executed, causes at least one computer to execute the performing and computing steps described herein.

Many alternatives, modifications, and variations will be apparent to those skilled in the art in light of the above teachings. Of course, those skilled in the art readily recognize that there are numerous applications of the invention beyond those described herein. While the present inventions has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A method for dynamic mapping of a computational block of a software program to cores of a multi-processor system at run-time, the method comprising:

evaluating, by the multi-processor system, a first number, $K_{1act}$, of available cores of a first type of the multi-processor system and a second number, $K_{2act}$, of available cores of a second type of the multi-processor system, wherein evaluating the first number, $K_{1act}$, of available cores is based on evaluating a number of cores of the first type busy with a background load of the multi-processor system, and wherein evaluating the second number, $K_{2act}$, of available cores is based on evaluating a number of cores of the second type busy with the background load of the multi-processor system;

determining, by the multi-processor system, a first number, n1, of loops of the computational block for binding with the available cores of the first type and a second number, n2, of loops of the computational block for binding with the available cores of the second type, wherein the computational block includes a plurality of loops, wherein the first number, n1, of loops is determined based on the first number of available cores of the first type, $K_{1act}$, the second number of available cores of the second type, $K_{2act}$, a clock frequency of a core of the first type, a clock frequency of a core of the second type, and a total number, N, of loops of the computational block, and according to the following relation:

$$n_1 \approx \left\lfloor \frac{N}{\left(\frac{K_{2act}}{K_{1act}}\right)\left(\frac{f_2}{f_1}\right)+1} \right\rfloor,$$

wherein $f_1$ is the clock frequency of a core of the first type, $f_2$ is the clock frequency of a core of the second type, and the operator $\lfloor \cdot \rfloor$ of a real-valued number denotes evaluation of an integer value of the number by omitting a fractional part of the number; wherein the second number, n2, of loops is determined such that a sum of the second number, n2, of loops and the first number, n1, of loops corresponds to the total number, N, of loops of the computational block;

binding, by the multi-processor system, the first number, n1, of loops with the available cores of the first type and binding the second number, n2, of loops with the available cores of the second type; and executing, by the multi-processor system, the loops of the computational block according to the binding of the first number, n1, of loops with the available cores of the first type and the binding of the second number, n2, of loops with the available cores of the second type;

wherein the binding of the loops with the cores is performed dynamically such that executing the loops bound with the cores is performed with the binding of the loops at run-time.

2. The method of claim 1, wherein determining the first number, n1, and the second number, n2, of loops is according to a load balancing relation with respect to the available cores of the first type and the available cores of the second type.

3. The method of claim 1, wherein determining the first number, n1, and second number, n2, of loops is in accordance with a performance of the cores of the first type and a performance of the cores of the second type, respectively.

4. The method of claim 1, wherein the first number, n1, of loops is further determined based on at least one of the following parameters: a loop execution time, T1, on a first core, and a loop execution time, T2, on a second core.

5. The method of claim 1, wherein a sum of the first number, $K_{1act}$, of available cores of the first type and the number of cores of the first type busy with the background load of the multi-processor system corresponds to the total number, K1, of cores of the first type; and wherein a sum of the second number, $K_{2act}$, of available cores of the second type and the number of cores of the second type busy with the background load of the multi-processor system corresponds to the total number, K2, of cores of the second type.

6. The method of claim 1, wherein the multi-processor system comprises a multi-core and many-core heterogeneous computing system.

7. The method of claim 1, wherein the computational block of the software program comprises a massive parallel computational block.

8. The method of claim 1, wherein a power consumption of a core of the first type is different from a power consumption of a core of the second type.

9. A non-transitory computer-readable medium storing instructions that, when executed, cause a computer to perform dynamic mapping of a computational block of a software program to cores of a multi-processor system that includes cores of a first type and cores of a second type, by performing the steps of:

evaluating a first number, $K_{1act}$, of available cores of a first type of the multi-processor system and a second number, $K_{2act}$, of available cores of a second type of the multi-processor system, wherein evaluating the first number, $K_{1act}$, of available cores is based on evaluating a number of cores of the first type busy with a background load of the multi-processor system, and wherein the evaluating the second number, $K_{2act}$, of available cores is based on evaluating a number of cores of the second type busy with the background load of the multi-processor system;

determining a first number, n1, of loops of the computational block for binding with the cores of the first type and a second number, n2, of loops of the computational block for binding with the cores of the second type, wherein the first number, n1, of loops is determined based on the first number of available cores of the first type, $K_{1act}$, the second number of available cores of the second type, $K_{2act}$, a clock frequency of a core of the first type, a clock frequency of a core of the second type, and a total number, N, of loops of the computational block, and according to the following relation:

$$n_1 = \left\lfloor \frac{N}{\left(\frac{K_{2act}}{K_{1act}}\right)\left(\frac{f_2}{f_1}\right)+1} \right\rfloor,$$

wherein $f_1$ is the clock frequency of a core of the first type, $f_2$ is the clock frequency of a core of the second type, and the operator $\lfloor \cdot \rfloor$ of a real-valued number denotes evaluation of an integer value of the number by omitting a fractional part of the number; wherein the second number, n2, of loops is determined such that a sum of the second number, n2, of loops and the first number, n1, of loops corresponds to the total number, N, of loops of the computational block;

binding the loops with the cores of the first type and the cores of the second type based on the evaluated available resources of the cores of the first type and the cores of the second type; and executing the loops bound with the cores;

wherein the binding of the loops with the cores is performed dynamically such that executing the loops bound with the cores is performed with the binding of the loops at run-time.

* * * * *

UNITED STATES PATENT AND TRADEMARK OFFICE
CERTIFICATE OF CORRECTION

PATENT NO.        : 10,162,679 B2
APPLICATION NO.   : 15/088974
DATED             : December 25, 2018
INVENTOR(S)       : Mikhail Petrovich Levin et al.

Page 1 of 1

It is certified that error appears in the above-identified patent and that said Letters Patent is hereby corrected as shown below:

In the Claims

Claim 1, Column 11, Line 50:

" $$n_1 = \left\lfloor \frac{N}{\left(\frac{K_{2act}}{K_{1act}}\right)\left(\frac{f_2}{f_1}\right) + 1} \right\rfloor ,$$ "

Should read:

$$n_1 = \left\lfloor \frac{N}{\left(\frac{K_{2act}}{K_{1act}}\right)\left(\frac{f_2}{f_1}\right) + 1} \right\rfloor$$

Claim 9, Column 13, Line 5:

" $$n_1 = \left\lfloor \frac{N}{\left(\frac{K_{2act}}{K_{1act}}\right)\left(\frac{f_2}{f_1}\right) + 1} \right\rfloor ,$$ "

Should read:

$$n_1 = \left\lfloor \frac{N}{\left(\frac{K_{2act}}{K_{1act}}\right)\left(\frac{f_2}{f_1}\right) + 1} \right\rfloor$$

Signed and Sealed this
Twenty-fifth Day of February, 2020

Andrei Iancu
*Director of the United States Patent and Trademark Office*